(12) United States Patent
Juraschek

(10) Patent No.: US 6,402,331 B1
(45) Date of Patent: Jun. 11, 2002

(54) VEHICLE MIRROR WITH PLUG TYPE CONNECTION

(75) Inventor: Peter Juraschek, Pleidesheim (DE)

(73) Assignee: Magna Reflex Holding GmbH, Assamstadt (DE)

( * ) Notice: Subject to any disclaimer, the term of this patent is extended or adjusted under 35 U.S.C. 154(b) by 0 days.

(21) Appl. No.: 09/719,492

(22) PCT Filed: May 10, 1999

(86) PCT No.: PCT/EP99/03172

§ 371 (c)(1),
(2), (4) Date: Dec. 11, 2000

(87) PCT Pub. No.: WO99/64270

PCT Pub. Date: Dec. 16, 1999

(30) Foreign Application Priority Data

Jun. 10, 1998 (DE) .................................. 298 10 522 U

(51) Int. Cl.⁷ .............................................. G02B 7/182
(52) U.S. Cl. ...................................... 359/881; 359/871
(58) Field of Search ................................ 359/871, 872, 359/877, 881; 248/480; 439/34

(56) References Cited

U.S. PATENT DOCUMENTS

| | | | | |
|---|---|---|---|---|
| 4,877,319 A | * | 10/1989 | Mittelhauser | 359/877 |
| 4,930,370 A | * | 6/1990 | Yoshida | 359/877 |
| 5,889,624 A | * | 3/1999 | Dickenson | 359/872 |
| 5,971,553 A | * | 10/1999 | Durnwald | 359/871 |

* cited by examiner

*Primary Examiner*—Cassandra Spyrou
*Assistant Examiner*—Alessandro V. Amari
(74) *Attorney, Agent, or Firm*—Clark Hill PLC

(57) ABSTRACT

A vehicle mirror which is constructed of two joined base parts, wherein the one base part is a mirror frame secured to a vehicle and the other base part is a mirror frame covering, and both base parts comprise complementary plug-in parts of a plug-type connection. The one plug-in part (1a) is secured to a sliding block (3) movably supported on the one base part (2a) and the other plug-in part (1b) is secured to the other base part (2b), wherein the sliding block (3) slides resiliently biased on a slide way (4) of the other base part (2b) during joining the base parts (2a, 2b), and the slide way (4) and sliding block (3) are formed such that the plug-in parts (1a, 1b) engage each other during joining the base parts (2a, 2b).

12 Claims, 4 Drawing Sheets

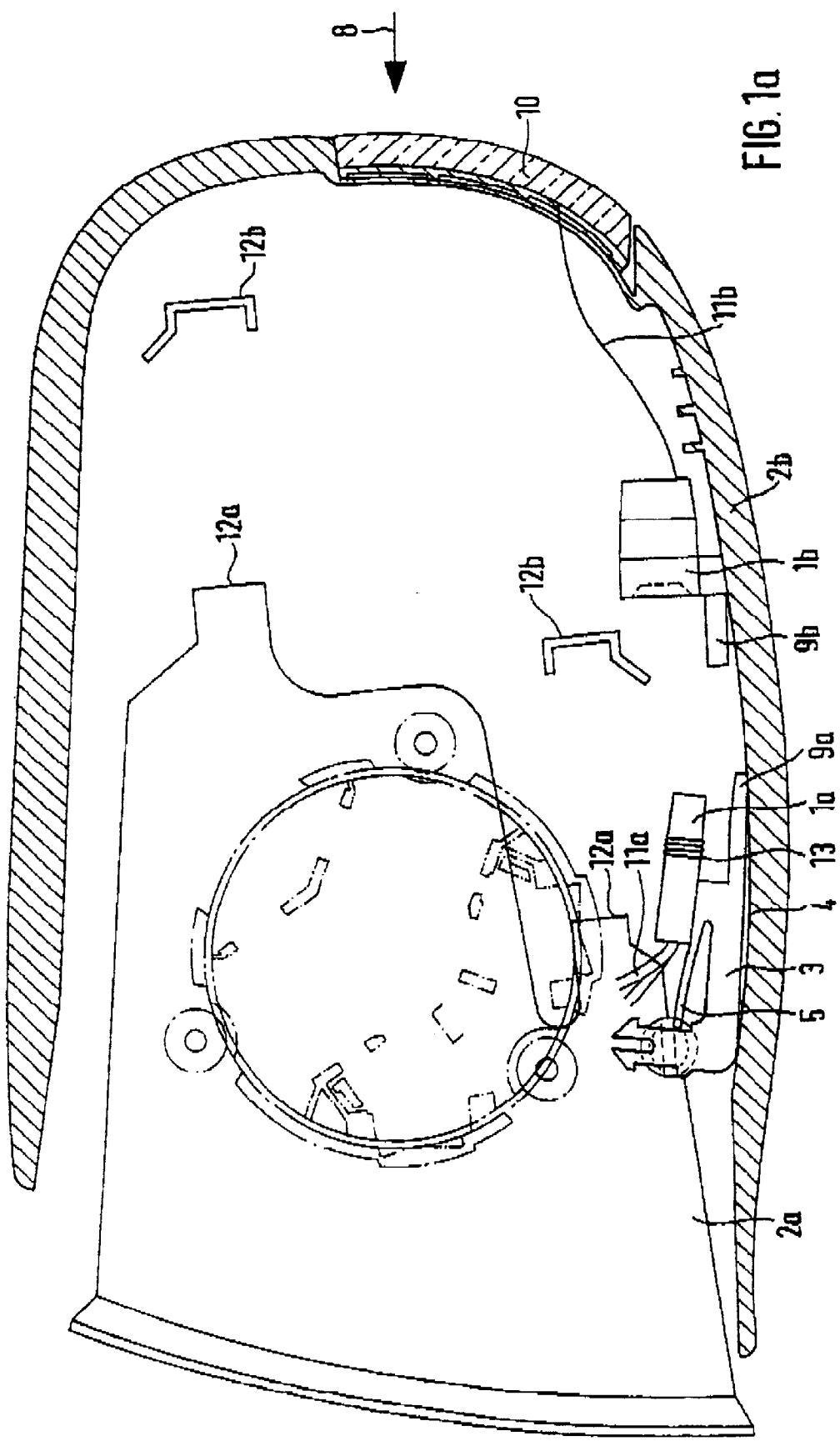

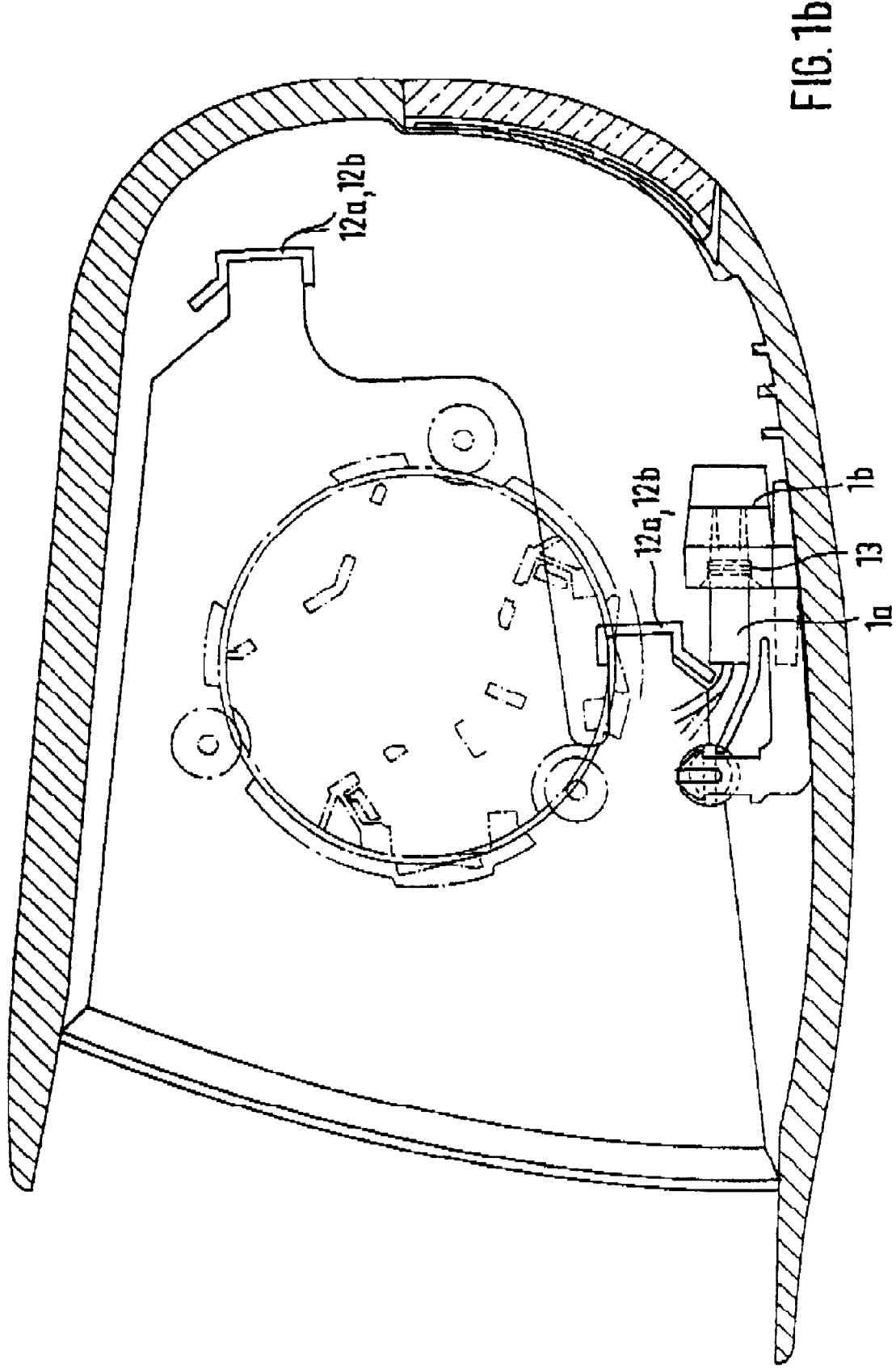

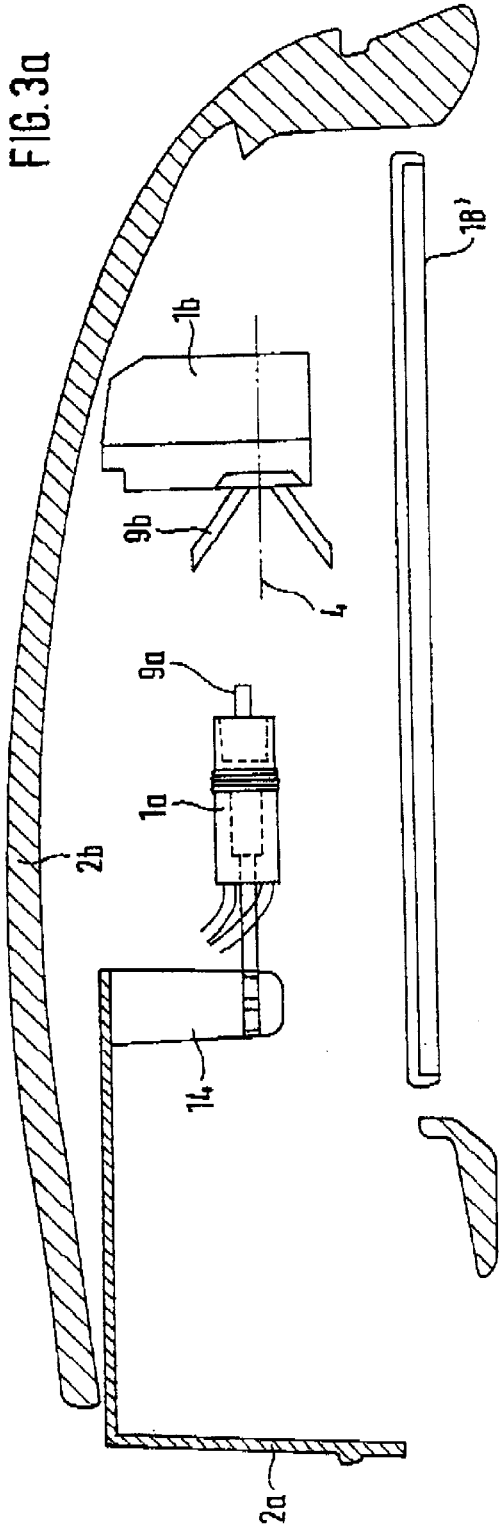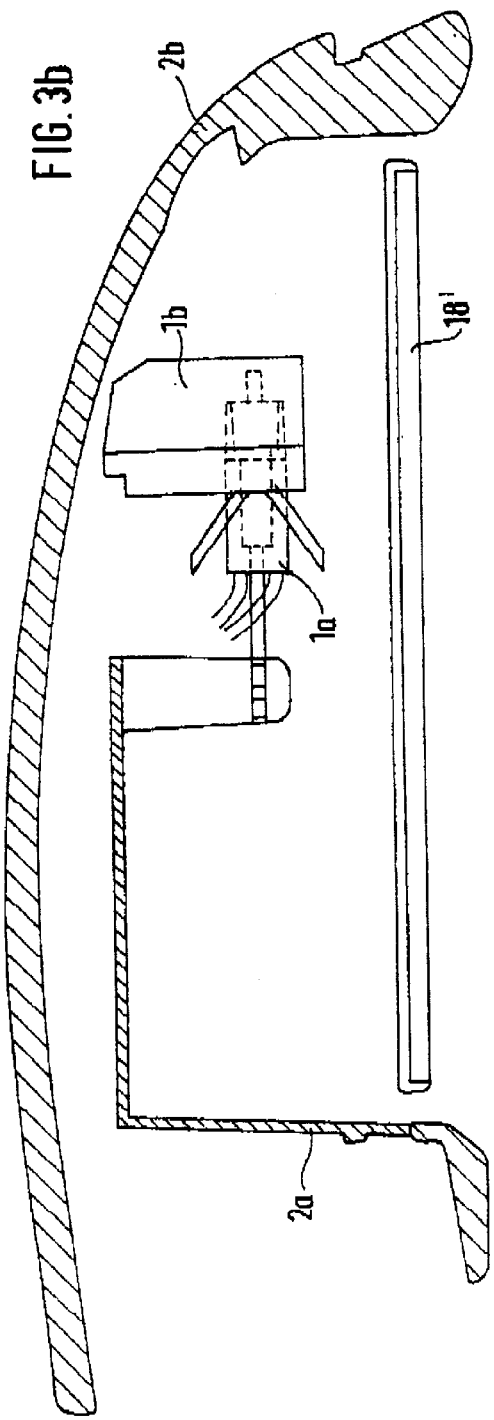

VEHICLE MIRROR WITH PLUG TYPE CONNECTION

BACKGROUND OF THE INVENTION

1. Field of the Invention

The present invention relates to a vehicle mirror having a plug type connection or joining parts thereof.

2. Description of Related Art

Vehicle mirrors are known, which are constructed of two joined base parts, wherein the base part is a mirror frame secured to a vehicle and the other base part is a mirror frame covering and both base parts comprise respective complementary plug-in parts of an electric plug-type connection, for example, which are rigidly connected to the base parts.

Such vehicle mirrors acceding to the prior art include the disadvantage, that the base parts and the plug-in parts, respectively, rigidly secured thereon have to be properly aligned one upon another during joining the two base parts, thus the plug-type connection is mode in fact. This is often made more difficult in that, the area of the plug-type connection is mostly not visible, since it is hided by the mirror frame covering. There is also the fact of a problematic nature of the joining tolerances with already small deviations and a faulty alignment of the plug-in parts, respectively, joining is made more difficult or is impossible by the jams and even a damage of the plug-in parts can occur, respectively.

BRIEF SUMMARY OF THE INVENTION

Assuming this prior art, the object of the present invention is to always ensure safe and simple joining of the plug-type connection without proper aligning a mirror frame and a mirror frame covering as well, which comprise respective complementary plug-in parts.

This object is solved by a vehicle mirror according to the preamble of the first claim in connection with the characterizing features of the first claim.

As a result of securing one plug-in part to a sliding block movably supported on the one base part and the other plug-in part to the other base part, wherein the sliding block slides resiliently biased on a slide way of the other base part during joining the base parts, and the slide way and sliding block are formed, such that the plug-in parts engage each other during joining the base parts, safe and simple joining of a plug-type connection composed of these plug-in parts is also ensured without proper aligning of the base parts. By the resilient movable support of the sliding block supporting the one plug-in part, jams and faulty alignments of both base parts to each other can always be compensated. Unaffected by alignment errors during joining the base parts, the sliding block secured to the one base part always stands on the slide way of the other base part and thus enables a safe guidance of the one plug-in part towards the other plug-in part, in order to make a plug-in connection.

The invention provides the sliding block to be provided with said one plug-in part either on the mirror frame or on the mirror frame covering, wherein the other plug-in part is then secured to the respective other base part. However, unaffected by this association, the alignment of the two plug-in parts to each other always remains by the resiliently movable sliding block.

Advantageous improvements of the present invention are indicated within the dependent claims.

An advantageous improvement of the invention provides the sliding block supporting the one plug-in part to comprise an inserting finger and the base part supporting the other plug-in part to comprise corresponding leading-in ribs. Herein, the inserting finger and leading-in ribs form an additional inserting aid, which although ensures the safe association of the two plug-in parts, for example, during a slight lateral deviation of the sliding block from the slide way. Thus, in connection with such additional inserting aid also enormous alignment errors can be corrected.

A particularly advantageous improvement provides the one plug-in part to be formed substantially finger-type and the other plug-in part to be fanned funnel-shaped. Herewith, another inserting aid is available, which prevents jams and ensures a particularly force free provision of the plug-type connection and thus a very low mechanical load of the plug-in parts and the sliding block, respectively.

Other advantageous embodiments of the present invention are indicated in the remaining dependent claims.

BRIEF DESCRIPTION OF THE DRAWINGS

In the following, the present invention is explained according to figures, in which FIGS. 1a and 1b depict side views of plug-in parts according to the invention in joined condition and a condition being not joined;

FIGS. 3a and 3b illustrate top views of the plug-in parts according to the invention in joined condition and a condition being not joined.

DETAILED DESCRIPTION OF THE INVENTION

Figure 2A:
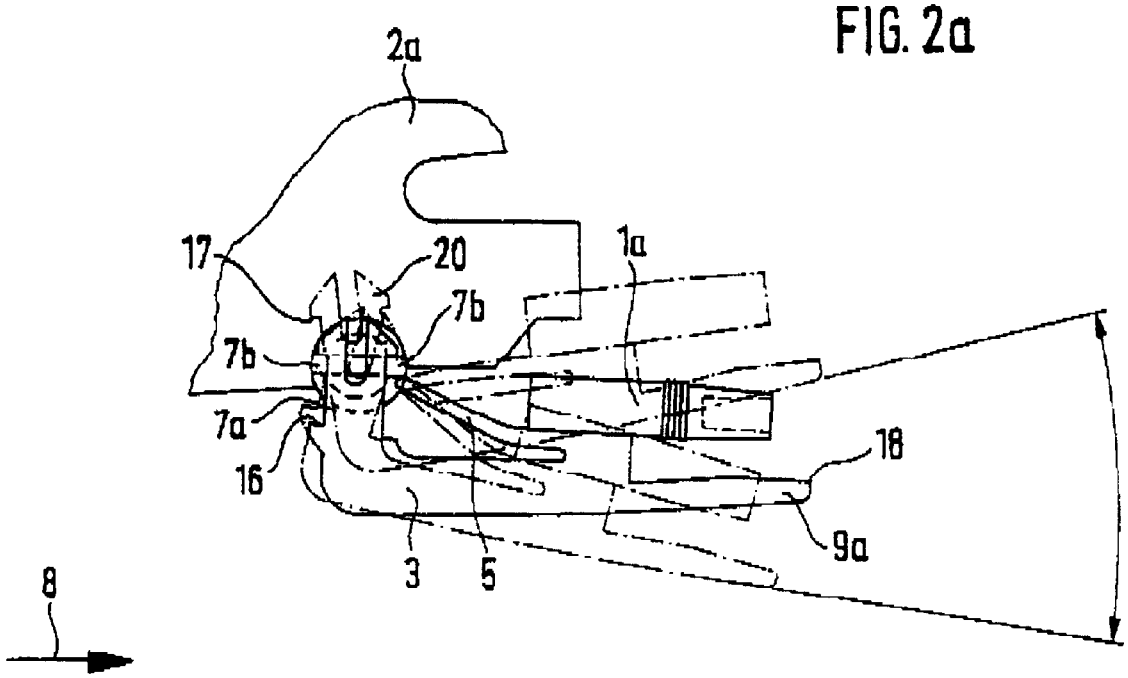
FIGS. 2a and 2b illustrate views of a sliding block according to the invention.

FIG. 1a depicts a base part 2a being constructed as a mirror frame. FIG. 1a shows the mirror frame from the perspective of a passenger being inside the vehicle, for reasons of clarity, however, a mirror glans secured to the mirror frame is not shown. A sliding block 3 is movably supported on the mirror frame 2a (it will be entered into the way of supporting with description of FIGS. 2a and 2b further below). The sliding block 3 is disposed longitudinally slidable inside the vertical axis as well an tiltably disposed inside the sheet plane. A spring element 5 associated with the sliding block 3, which is constructed as a support potruding from the sliding block 3, engages the mirror frame 2a with the free end thereof. By this engagement, the sliding block is forced downwards, in FIG. 1a) that is against an inner contour of the base part 2b constructed as mirror frame covering. At the same time, by this engagement a torque is generated on the sliding block 3, which also presses the inserting finger 9a against the inner contour of the mirror frame covering 2b. The sliding block 3 also carries a plug-in part 1a, which is connected to the power supply of the motor vehicle via electric lines 11a.

During mounting the vehicle mirror, the mirror frame covering 2b is turned up on the mirror frame 2a. The mirror frame covering 2b is roughly aligned with respect to the mirror frame 2a, such that the corresponding engaging element 12a of the mirror frame and the engaging element 12b of the mirror frame covering engage to each other (such a rough alignment of the two base parts, however, is not sufficiently for proper aligning of the plug-in part 1a, since with a fixed supporting the plug-in part 1a on the mirror frame 2a, already smallest changes of position of the plug-in part 1a with respect to the mirror frame 2a would lead to inaccuracies and the impossibility of joining a plug-type connection respectively).

During slipping on the mirror frame covering 2b upon the mirror frame 2a, the sliding block 3 slides down on the inner contour (of a slide way 4) of the mirror frame covering 2b. Herein, slipping on is substantially achieved in the mounting and plug-in direction 8, respectively. The slide block 3 runs out on the slide way 4 as long as the plug-in part 1a in inserted into the plug-in part 1b and electric connection consists between the cables 11a and 11b by means of contacts, which are not shown in more detail. By means of these cables the power supply of a direction indicator 10 secured to the mirror frame covering is achieved. Of course, it is possible with the cable other consumers to be supplied with current as well, for example the receiver of a remote controlled door lock control of the vehicle, parts of an alarm etc.

During plugging the mirror frame covering 2b, slight torsions and tiltings, respectively, or differences in height between the mirror frame covering 2b and the mirror frame 2a are quite permissible, since by virtue of the resilient longitudinal guidance of the sliding block 3 the same in always pressed against the slide way 4 of the mirror frame covering.

Of course it is also possible to perform a "kinematic return", that means to arrange the plug-in part 1b on the mirror frame 2a and to arrange the gliding block 3 having the plug-in part 1a on the mirror frame covering 2b.

If there should be any unexpected position deviations of the individual plug-in parts to each other in the very nearest approaching area of the plug-in parts 1a and 1b perhaps by virtue of any deviations of the sliding block 3 from the slide way 4, nevertheless safe manufacturing of the connection also occurs with the self-finding contour of the plug-in part 1a and the plug-in part 1b, respectively. The plug-in part 1a is substantially constructed bar-shaped and finger-type, the plug-in part 1b includes a feed hopper having square cross-section and rotationally symmetrical cross-section, respectively. With this combination sliding off the plug-in part 1a on the hopper, shown in FIG. 1b, and thus making the plug-type connection also with slight alignment errors are always enabled. Of course, it is possible, however, to construct the plug-in part 1a hopper-shaped and the plug-in part 1b finger-type in analogous manner.

For manufacturing a particularly watertight and dirt-repelling connection, respectively, between the plug-in art 1a and the plug-in part 1b, the plug-in part 1a constructed finger-type comprises several encircling sealing ribs 13. The electric contact area of the plug-type connection made by means of not shown contacts in the interior of the plug-in parts 1a and 1b, respectively, is protected herewith. The two plug-in parts 1a, 1b partially overlap in joined condition, the sealing ribs 13 being in joined condition of the plug-type connection are disposed inside the overlapping area of such both plug-in parts. Such a sealing according to the invention makes particular sense with electric connections, if the plug-type connection is constructed as an optical, electric, hydraulic or a mechanical linkage such a sealing can be abandoned in the single case.

FIG. 1b illustrates the parts from FIG. 1a in joined condition, in which the sealing ribs 13 disposed in the overlapping area of the plug-in parts 1a and 1b are also shown. In this joined condition the engaging element 12a of the mirror frame and engaging element 12b of the mirror frame covering are also engaged with each other, wherein locating is achieved with fixing elements, which are not shown in greater detail.

FIG. 2a shows a detail view of the sliding block 3 in various excursion positions and swivelling positions, respectively. The sliding block 3 is guided inside a fixing device 14, which protrudes from the base part 2a. Fixing device 14 is substantially constructed barrel-shaped. Within the area of the cover 15 the fixing device 14 is slitted above and below, such that the cover 15 (better seen in FIG. 2b) in merely connected to the remainder of the fixing device 14 by a narrow web 7b. Inside the slitted area of the fixing device 14 the sliding block 3 is guided longitudinally slidable with a guide surface 7a. A lower stop limit 16 as well as an upper stop limit 17 of the guide surface 7a prevent slipping of the sliding block 3 out of the support. At the free end of the sliding block 3, to which the stop limit 17 is also positioned, the sliding block 3 is centrally slitted and comprises locking projections 20. These locking projections grip past the web 7b of the support. The spring element 5 associated with the sliding block 3 also presses against the web 7b. While shifting the sliding block 3 upwards in FIG. 2a, (it appears a displacement with respect to the fixing device 14) thus the spring element 5 generates an opposed force, which is directed downwards. Such an opposed force also originates when the inserting finger 9a is tilted upwards in FIG. 2a. If no external influences act upon the sliding block 3, thus a normal position results therefrom, which is indicated with the numeral 18.

Figure 2B:
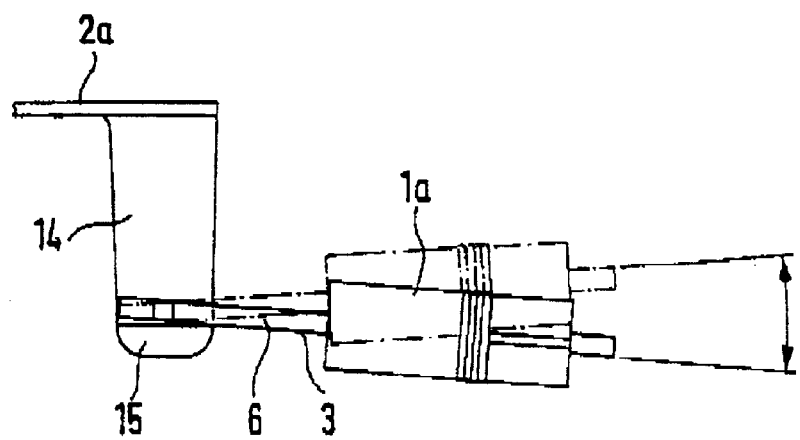

FIG. 2b illustrates a top view of the sliding block 3 from FIG. 2a. It is clearly illustrated, that a motion of the plug-in part 1a transversely to the plugging direction 3 is also possible in this plane by virtue of the resilient portion 6 of the sliding block 3.

FIG. 3a illustrates a top view of the apparatus from FIG. 1a. The mirror glass 18' in section can also be seen herein In the end portion of the slide way 4 are located leading-in ribs 9b substantially protruding radiately toward the sides. These leading-in ribs are arranged for receiving one inserting finger 9a slipping off from the leading-in ribs 9b and thus inserting the plug-in part 1a into the plug-in part 1b. By virtue of the transverse elasticity of the sliding block 3, shown in FIG. 2b, also with slight alignment errors in crosswise direction, the plug-in part 1a can be plugged into the plug-in part 1b, without the occurrence of any jams between the mirror frame 2a and the fixing device 14, respectively or the sliding block 3 as well as the mirror frame support 2b.

Of course, it is also possible the leading-in ribs 9b to fixedly fit to the sliding block 3 and the inserting finger 9a to fixedly fit to the plug-in part 1b.

FIG. 3b depicts the parts of FIG. 3a in joined condition. The inserting finger 9a is located herein inside a not shown aperture gaping between the leading-in ribs 9b.

What is claimed is:

1. A vehicle mirror constructed of two joined base parts, wherein one base part is a mirror frame secured to a vehicle and the other base part is a mirror frame covering and both base parts comprise complementary plug-in parts of a plug-type connection, characterized in that said one plug-in part (1a) is secured to a sliding block (3) movably supported on said one base part (2a) and said other plug-in part (1b) is secured to the other base part (2b), wherein said sliding block (3) glides resiliently biased on a slide way (4) of said other base part (2b) during joining the base parts (2a, 2b), and the glide way (4) and the sliding block (3) are formed such that said plug-in parts (1a, 1b) engage each other during joining the base parts (2a, 2b).

2. A vehicle mirror according to claim 1, characterized in that said sliding block (3) comprises resilient portions (6) and/or components (7a) for a length compensation and for horizontal swing of said one plug-in part (1a) in two directions essentially being perpendicularly disposed to each other in a plane being perpendicularly to the plug-in direction (8) of said plug-type connection.

3. A vehicle mirror according to claim 1, characterized in that said sliding block (3) is secured to one of said base parts (2*a*) with a snap connection (7*b*, 20) having a length compensation (7*a*, 7*b*).

4. A vehicle mirror according to claim 1, characterized in that said sliding block (3) is connected to a spring element (5) for pressing said sliding block (3) against said slide way (4).

5. A vehicle mirror according to claim 4, characterized in that said spring element (5) is constructed as a resilient portion of said sliding block (3).

6. A vehicle mirror according to claim 1, characterized in that said slide way (4) is constructed as an inner contour of one of said base parts (2*b*).

7. A vehicle mirror according to claim 1, characterized in that said one sliding block (3) supporting said one plug-in part (1*a*) comprises an inserting finger (9*a*) ad said base part (2*b*) supporting said other plug-in part (1*b*) comprises corresponding leading-in ribs (9*b*).

8. A vehicle mirror according to claim 3, characterized in that said sliding block (3) supporting said one plug-in part (1*a*) comprises leading-in ribs and said base part supporting said other plug-in part (1*b*) comprises a corresponding inserting finger.

9. A vehicle mirror according to claim 1, characterized in that said one plug-in part (1*a*) is substantially formed finger-type and said other plug-in part (1*b*) is formed funnel-shaped.

10. A vehicle mirror according to claim 1, characterized in that said both plug-in parts (1*a*, 1*b*) at least partially overlap in joined condition, and at least one plug-in part (1*a*) comprises sealing ribs (13) encircling in planes being perpendicularly to the plug-in direction (8), which are disposed in an overlapping area of said two plug-in parts (1*a*, 1*b*), in joined condition of the plug-type connection.

11. A vehicle mirror according to claim 1, characterized in that said plug-type connection is a linkage transferring an optical, electric, hydraulic or a mechanical power.

12. A vehicle mirror according to claim 1, characterized in that, said mirror frame covering (2*b*) includes one direction indicator (10) and said plug-type connection (1*a*, 1*b*) is an electric connection for a paver supply of the direction indicator.

* * * * *

UNITED STATES PATENT AND TRADEMARK OFFICE
CERTIFICATE OF CORRECTION

PATENT NO. : 6,402,331 B1
DATED : June 11, 2002
INVENTOR(S) : Juraschek

It is certified that error appears in the above-identified patent and that said Letters Patent is hereby corrected as shown below:

Column 1,
Line 2, delete "or" and insert -- for --.
Line 20, delete "mode" and insert -- made --.
Line 22, delete "hided" and insert -- hidden --.
Line 24, delete "tolerances with" and insert -- tolerances. With --.

Column 2,
Line 11, delete "fanned" and insert -- formed --.
Line 42, delete "an" and insert -- as --.
Line 48, delete "1a)" and insert -- 1a, --.
Line 62, delete "sufficiently" and insert -- sufficient --.

Column 3,
Line 20, delete "in" and insert -- is --.
Line 44, delete "art" and insert -- part --.
Line 66, delete "detail" and insert -- detailed --.

Column 4,
Line 31, delete " 18' " and insert -- 18 --.
Line 59, delete "glides" and insert -- slides --.

Column 6,
Line 19, delete "that, said" and insert -- that said --.
Line 21, delete "paver" and insert -- power --.

Signed and Sealed this

Twenty-sixth Day of November, 2002

*Attest:*

*Attesting Officer*

JAMES E. ROGAN
*Director of the United States Patent and Trademark Office*